United States Patent
Shaw et al.

(10) Patent No.: US 7,511,624 B2
(45) Date of Patent: Mar. 31, 2009

(54) OPTICAL DETECTION OF OSCILLATING TARGETS USING MODULATION OF SCATTERED LASER LIGHT

(75) Inventors: Joseph A. Shaw, Bozeman, MT (US);
Kevin S. Repasky, Bozeman, MT (US);
John L. Carlsten, Bozeman, MT (US);
Lee H. Spangler, Bozeman, MT (US);
David S. Hoffman, Bozeman, MT (US)

(73) Assignee: Montana State University, Bozeman, MT (US)

( * ) Notice: Subject to any disclaimer, the term of this patent is extended or adjusted under 35 U.S.C. 154(b) by 141 days.

(21) Appl. No.: 11/338,806

(22) Filed: Jan. 25, 2006

(65) Prior Publication Data
US 2006/0254522 A1     Nov. 16, 2006

Related U.S. Application Data

(60) Provisional application No. 60/646,940, filed on Jan. 25, 2005.

(51) Int. Cl.
*G08B 23/00* (2006.01)
(52) U.S. Cl. .................. 340/573.1; 702/5; 250/221; 340/573.2
(58) Field of Classification Search .............. 340/573.1; 702/19, 5; 73/866; 250/221; 342/54
See application file for complete search history.

(56) References Cited

U.S. PATENT DOCUMENTS

| | | | |
|---|---|---|---|
| 3,912,810 A | 10/1975 | Eddy | |
| 5,146,287 A * | 9/1992 | Carder | 356/5.02 |
| 6,083,498 A | 7/2000 | Landolt | |
| 6,653,971 B1 * | 11/2003 | Guice et al. | 342/54 |
| 6,708,443 B2 * | 3/2004 | Hall | 43/107 |
| 6,766,251 B2 * | 7/2004 | Mafra-Neto et al. | 702/5 |
| 7,071,829 B2 * | 7/2006 | Gardner et al. | 340/573.2 |
| 2001/0009458 A1 * | 7/2001 | Asaka et al. | 356/28.5 |
| 2004/0001662 A1 * | 1/2004 | Wong et al. | 385/15 |
| 2005/0030222 A1 * | 2/2005 | Steudel | 342/95 |
| 2005/0122218 A1 * | 6/2005 | Goggin | 340/552 |
| 2006/0060759 A1 * | 3/2006 | Predina et al. | 250/216 |

OTHER PUBLICATIONS

S.C. Reed, C.M. Williams, and L.E. Chadwick, "Frequency of Wing-Beat as a Character for Separating Species Races and Geographic Varieties of Drosophila," *Genetics* 27, p. 349, May 1942; 13 pages.

"Photoelectric Cell Observations of Insects in Flight," *Nature* Jan. 15, 1995, pp. 128-129; 2 pages.

D. M. Unwin and C.P. Ellington, "An Optical Tachometer for Measurement of the Wing-Beat Frequency of Free-Flying Insects," *J. Exp. Biol.* 82, pp. 377-378, 1979; 2 pages.

A. Moore, J.R. Moore, B.E. Tabashnik and S.H. Gage, "Automated Identification of Flying Insects by Analysis of Wing-Beat Frequencies," *J. Economic Entomology* 79(6), pp. 1703-1706, 1986; 4 pages.

(Continued)

*Primary Examiner*—George A Bugg
*Assistant Examiner*—Hoi C Lau
(74) *Attorney, Agent, or Firm*—Cooley Godward Kronish LLP

(57) ABSTRACT

The present invention provides systems and methods using a temporal-frequency sensitive receiver to detect laser light that is scattered by an oscillating object, thereby allowing remote monitoring of the object's position and movement.

19 Claims, 6 Drawing Sheets

OTHER PUBLICATIONS

A. Moore and R.H. Miller, "Automated Identification of Optically Sensed Aphid (Homoptera: Aphidae) Wing-Beat Waveforms," *Ann. Entomological Society of America*, 95, pp. 1-8, 2002; 8 pages.

Smith et al., "Volatile and Semi-Volatile Organic Compounds in Beehive Atmospheres" in Honey Bees: Estimating the Environmental Impact of Chemicals, Taylor and Francis, London and New York. 2:12-41, DeVillers, J. and M-h Pham-Delegue, Eds., 2002; 17 pages.

Bromenshenk et al., Biological systems *Alternatives for Landmine Detection*, RAND Science and Technology Institute for Office of Science and Technology Policy Report, Arlington, VA. Appendix S, Eds. J MacDonald et al. 2003; 11 pages.

Bromenshenk et al., "Can Honey Bees Assist in Area Reduction and Landmine Detection?", Journal of Mine Action vol. 7.3, 2003; Bromenshenk et al., 2004, Technical Report-Study/Services, CDRL DI-MISC-80598A, for Joint Chiefs of Staff, 2004; 6 pages.

Bender et al., "Tracking Honey Bees Using Lidar (Light Detection and Ranging) Technology," Sandia Report SAND2003-0184 (2003), Sandia National Laboratory, Albuquerque, NM 87185; 20 pages.

A. V. Oppenheim and R. W. Schafer, *Discrete-time signal processing*, Prentice-Hall Publishers, 1989. ch. 9) included in the MatLab® software (The MathWorks, Inc., 3 Apple Hill Drive, Natick, MA 01760-2098, www.mathworks.com).

Aldrich et al; Identification of a New Predaceous Stink Bug Pheromone and Its Attractiveness to the Eastern Yellowjacket; 1986. Experientia. vol. 42, pp. 583-585.

Bender et al. ("Tracking Honey Bees Using Lidar (Light Detection and Ranging) Technology," Sandia Report SAND2003-0184 (2003), Sandia National Laboratory, Albuquerque, NM 87185).

Bromenshenk et al., "Can Honey Bees Assist in Area Reduction and Landmine Detection?", Journal of Mine Action vol. 7.3, 2003; Bromenshenk et al., 2004, Technical Report-Study/Services, CDRL DI-MISC-80598A, for Joint Chiefs of Staff, 2004).

Bromenshenk et al., Biological systems *Alternatives for Landmine Detection*, RAND Science and Technology Institute for Office of Science and Technology Policy Report, Arlington, VA. Appendix S, Eds. J. MacDonald et al. 2003.

D. M. Unwin and C. P. Ellington, "An optical tachometer for measurement of the wing-beat frequency of free-flying insects," *J. Exp. Biol.* 82, pp. 377-378, 1979.

Davis et al. :2,4-Hexadienyl Butyrate and Related Compounds Highly Attractive to Yellow Jackets; 1967. J. Med. Entomol. vol. 4, pp. 275-280.

Davis et al. "Heptyl Butyrate, a New Synthetic Attractant for Yellow Jackets," 1969. J. Econ. Entomol. vol. 62, p. 1245.

Davis et al. "Octyl Butyrate, an Effective Attractant for the Yellowjacket," 1972. Environmental Entomol. vol. 1, p. 673-674.

McGovern et al. "Esters Highly Attractive to Vespula spp.," 1970. J. Econ. Entomol. vol. 63, pp. 1534-1536.

Davis et al. "Perimeter Traps Baited with Synthetic Lures for Suppression of Yellowjackets in Fruit Orchards," 1973. Environmental Entomol. vol. 2, pp. 569-571.

De Bruyne et al., "Odor Coding in the Drosophila Antenna", 2001, Neuron vol. 30 pp. 537-552.

Hill et al., "G Protein-Coupled Receptors in Anopheles Gambiae," 2002 Science vol. 298 pp. 176-178.

Kotelnikov, "On the carrying capacity of the ether and wire in telecommunications," Material for the First All-Union Conference on Questions of Communication, Izd. Red. Upr. Svyazi RKKA, Moscow (1993) (Russian).

Kreiger et al., "Three pheromone-binding proteins in olfactory sensilla of the two silkmoth species *Antheraea polyphemus* and *Antheraea pernyi* ," May 2000Eur J Biochem.; 267(10); pp. 2899-908.

Krieger et al. "A divergent gene family encoding candidate olfactory receptors of the moth Heliothis verscens,"; Aug. 2002; Eur J Neurosci.; vol. 16(4); pp. 619-28.

MacDonald et al. "Attraction of Yellowjackets (Vespula spp.) to Heptyl Butyrate in Washing State," 1973. Environmental Entomol. vol. 2, pp. 375-379.

Moore and Miller ("Automated identification of optically sensed Aphid (Homoptera: Aphidae) wing-beat waveforms," *Ann. Entomological Society of America*, 95, pp. 1-8, 2002).

Moore et al. (A. Moore, J. R. Miller, B. E. Tabashnik, and S. H. Gage, "Automated identification of flying insects by analysis of wing-beat frequencies," *J. Economic Entomology* 79(6), pp. 1703-1706, 1986).

Nyquist, "Certain topics in telegraph transmission theory," Trans. AIEE, vol. 47, pp. 617-644 (Apr. 1928).

Oppenheim et al., Signal and Systems, second edition, Prentice Hall, New Jersey, 1997, 514-581.

Richards "Photoelectric cell observations of insects in flight," *Nature* Jan. 15, 1995, pp. 128-129.

Rostelien et al. "Selective receptor neurone responses to e-β-ocimene, β-myrcene, E,E-x-farnesene and homo-farnesen in the moth Heliothis virescens, identified by gas chromatography linked to electrophysiology," (J Comp Physiol [A]. Sep. 2000; 186(9):833-47).

S. C. Reed, C. M. Williams, and L. E. Chadwick, "Frequency of wing-beat as a character for separating species races and geographic varieties of drosophila," *Genetics* 27, p. 349, May 1942).

Shannon, "Communications in the presence of noise", Proc. Institute of Radio Engineers, vol. 37, No. 1, pp. 10-21 (Jan. 1949).

Shaw et al., "Polarization lidar measurements of honey bees for detecting land mines," Optics Express 13(15), 5853-5863 (2005).

Smith et al., "Volatile and semi-volatile organic compounds in beehive atmospheres" In Honey Bees: *Estimating the Environmental Impact of Chemicals*; Taylor and Francis, London and New York. 2:12-41, DeVillers, J. and M-H Pham-Delegue. Eds., 2002.

Whittaker, "On the Functions Which are Represented by the Expansions of the Interpolation Theory," Proc. Royal Soc. Edinburgh, Sec. A, vol. 35, pp. 181-194 (1915).

* cited by examiner

OPTICAL DETECTION OF OSCILLATING TARGETS USING MODULATION OF SCATTERED LASER LIGHT

CROSS-REFERENCES TO RELATED APPLICATIONS

This application claims the benefit of U.S. Provisional Patent Application No. 60/646,490, filed on Jan. 25, 2005, which is herein incorporated in its entirety.

STATEMENT REGARDING FEDERALLY SPONSORED RESEARCH OR DEVELOPMENT

This invention was made with government support under contract DAAB07-03-D-2130 awarded by the Army Night Vision Laboratory and contract N66001-04-D-5024/0001 awarded by the U.S. Department of Defense Space and Naval Warfare Systems Center. The government has certain rights in the invention.

BACKGROUND OF THE INVENTION

The use of wing-beat frequency for insect detection prior to the instant invention has relied on wing-beat modulation of either sunlight or light from a Light Emitting Diode (LED), halogen lamp, or other broadband artificial light source. For example, Reed et al. describe using stroboscopic photography to study the wing-beat frequency as a mechanism of identifying insect species by photographing insect wings in motion through the use of flashing lights synchronized with the wings (S. C. Reed, C. M. Williams, and L. E. Chadwick, "Frequency of wing-beat as a character for separating species races and geographic varieties of *drosophila*," *Genetics* 27, p. 349, May 1942). Also, Richards ("Photoelectric cell observations of insects in flight," *Nature* Jan. 15, 1995, pp. 128-129) reported bursts of signal when viewing the Sun with a photocell that he ascribed to wing-beat modulations by flying insects. Another relatively early paper describing an optical technique to study insect wing beats is that of D. M. Unwin and C. P. Ellington, "An optical tachometer for measurement of the wing-beat frequency of free-flying insects," *J. Exp. Biol.* 82, pp. 377-378, 1979. Their paper describes an electronic circuit for a system using a photodiode to detect wing-beat frequency using wing-beat modulated ambient light (i.e., sunlight).

Moore et al. (A. Moore, J. R. Miller, B. E. Tabashnik, and S. H. Gage, "Automated identification of flying insects by analysis of wing-beat frequencies," *J. Economic Entomology* 79(6), pp. 1703-1706, 1986) describe the use of a microcomputer-based instrument to record and analyze flight movements of individual mosquitoes (i.e., *Aedes aegypti* (L.) and *A. triseriatus*) flying through a light beam. Moore and Miller ("Automated identification of optically sensed Aphid (Homoptera: Aphidae) wing-beat waveforms," *Ann. Entomological Society of America*, 95, pp. 1-8, 2002) use an optical sensor to make digital recordings of wing-beat waveforms for the five most common aphids found on Guam. In this study the insects were housed in a clear plastic jar with the detector placed on one side and a halogen lamp on the other side as the source. The distance between the detector and source was 0.5 m. These articles appear to be the basis of the 'Optical Flying Insect Detection and Identification System' (OFIDIS) for automated insect species detection marketed by Qubit Systems Inc. (http://www.qubitsystems.com/). The User's Manual for the OFIDIS system is available online at http://frontpage2000.family-net.org/amoore/LibDocs/ofidis-_document_library.htm. This manual is dated Jul. 6, 2001, and provides experimental results for the pomace fly (*Drosophila melanogaster*), red lily leaf beetle (*Liliocerus lilii*) and pink-spotted lay beetle (*Coleomegilla maculata*). The optical source for OFIDIS can be either the Sun, in which case the detector is oriented to look upward, or an artificial source such as an LED or halogen lamp, in which case the light source is pointed at the detector and the signal is created by insects modulating the transmitted light as they fly between the lamp and the detector. The lamp-based method uses the detection of transmitted light as an insect flies through a small region between the transmitting lamp and a detector (i.e., it is a transmitted-light measurement, not a scattered-light measurement). Sable Systems International sell the iFlySpy™ system, which uses a solar cell detector to detect wing-beat modulated sunlight in a manner very similar to that of the OFIDIS system (http://www.sablesys.com/iflyspy.html). Neither of these measurement schemes (Sun or LED) allow remote detection of insects in a horizontal-viewing mode with significant standoff distances between the measurement region and the sensor (i.e., >5 m, preferably tens of meters).

Anti personnel landmines kill approximately 15,000-20,000 people each year in roughly 90 countries (MacDonald et al., "Alternatives for landmine detection" (RAND Corp., 2003). Current detection methods for landmines include sweeping hand held metal detectors over suspected mine fields. However, this method results in high false alarm rates due to the inability to differentiate between landmines and other metallic objects and cannot detect plastic and plastic-like materials also used in landmines.

Active research in land mine detection includes electromagnetic induction, infrared and hyperspectral imaging, electrical impedance tomography, ground penetrating radar, electrochemical methods, and biological methods. The most common type of biological detection uses a trained dog and a handler. The dog is trained to detect the odor associated with the explosive contained in the landmine and then alert the handler. To accomplish this, the team must work in the mine field, placing both the dog and handler at risk.

A recently demonstrated biological detection technique by Bromenshenk et al. uses honeybees to locate buried landmines and explosives through the honeybee's sense of smell and their natural foraging behavior (Smith et al., "Volatile and semi-volatile organic compounds in beehive atmospheres" In Honey Bees: *Estimating the Environmental Impact of Chemicals*. Taylor and Francis, London and New York. 2:12-41, DeVillers, J. and M-H Pham-Delegue. Eds., 2002 ; Bromenshenk et al., Biological systems *Alternatives for Landmine Detection*, RAND Science and Technology Institute for Office of Science and Technology Policy Report, Arlington, Va. Appendix S, Eds. J. MacDonald et al. 2003; Bromenshenk et al., "Can Honey Bees Assist in Area Reduction and Landmine Detection?", Journal of Mine Action Vol. 7.3, 2003; Bromenshenk et al., 2004 , Technical Report-Study/Services, CDRL DI-MISC-80598A, for Joint Chiefs of Staff, 2004 ). The honeybee conditioning is accomplished by adding trace amounts of the major chemical components of the explosive into a feeder. The honeybees are thus conditioned to associate the chemical smell with food and when the honeybees are released over a mine field, they will pause over the landmines as they forage for food. Trained honeybees were able to detect vapor levels higher than 50 parts per trillion (pptr) of 2,4 dinitrotoulene (2,4-DNT) mixed in sand (Bromenshenk et al., "Can Honey Bees Assist in Area Reduction and Landmine Detection?", Journal of Mine Action Vol. 7.3, 2003).

The demonstrated ability of honeybees to detect explosives has led to a need for methods to remotely detect the presence and dwell time of honeybees in flight. Bender et al. ("Tracking Honey Bees Using Lidar (Light Detection and Ranging) Technology," Sandia Report SAND2003-0184 (2003), Sandia National Laboratory, Albuquerque, N.Mex. 87185) pointed an existing atmospheric lidar system horizontally over a bee hive and demonstrated that they could see bees at a range of hundreds of meters. They operated in a vegetation-free environment and avoided letting the laser beam hit any object other than free-flying bees. The lidar instrument was aimed directly over a beehive where there was a high density of bees. However, this system was not tested with low honeybee density away from the beehive.

The prior art techniques discussed above cannot be used easily or effectively for measuring insect density over a region, such as an area suspected to contain explosives. Regarding the sunlight-based system, the Sun is rarely in a location so as to provide effective horizontal viewing (as opposed to detecting insects overhead). Regarding the LED- or lamp-based transmission system, the insects are only detected when they fly through a small sample region defined by the transmit-receive module and thus does not facilitate remote detection, such as of a potentially dangerous region. Regarding the direct-detection lidar systems, bee detection is complicated by the inability to distinguish between backscattered signals from bees and vegetation or other objects.

The following paragraphs describe these previous systems in more detail.

BRIEF SUMMARY OF THE INVENTION

The present invention is based on the discovery discussed herein that using backscattered laser light in a system to detect insect wing-beats allows the sensor and operator to be located remotely from the sample/detection region and identify bees with a signal that is different for other flying insects and other background objects. The present invention provides systems and methods for the remote detection, identification, monitoring and/or tracking of insects in a cluttered environment using wing-beat modulated laser light providing at least the following advantages over prior art wing-beat detection systems: (1) the present system can be pointed in any direction for remote detection of insects; (2) the present system does not rely on either reflected sunlight or directly transmitted light provided by a lamp situated across the measurement area from the receiver; (3) the present system can detect a polarized signal so that the nominally unpolarized background light is reduced by half and the co-polarized signal identifies bees better than either cross-polarized or unpolarized techniques; and (4) the present system provides a frequency-domain signal that allows unique identification of flying insects in a cluttered environment. The present invention can be implemented in a continuous-wave (cw) mode or a pulsed mode, with the latter system directly yielding a measure of range to the oscillating target.

The present invention provides an optical insect detection system that utilizes a laser backscatter system to achieve long-distance remote detection with the sensor system pointed in any desired direction. The present invention is especially suited for remotely searching sample regions for dangerous materials (such as explosives) in an environment with vegetation and other non-insect objects to scatter light.

The present invention provides systems and methods for the remote detection, identification, monitoring and/or tracking of insects in a cluttered environment using wing-beat modulated laser light that provide at least the following advantage over prior art direct-detection light detection and ranging (lidar) systems: the present system allows for identifying insects separately from vegetation and other scattering objects in the light beam rather than having to either measure only in vegetation-free areas or remove vegetation prior to conducting measurements.

The systems and methods of the present invention may also be used to detect, identify, monitor and/or track certain other types of moving animals in addition to insects, such as flocks of birds (e.g., homing pigeons, ducks or geese) and flying mammals, such as bats. The systems and methods of the present invention should be able to detect, identify, monitor and/or track any animal species whose wings scatter light significantly. For example, the present invention may also be used to detect, identify, monitor and/or track bat wing-beat frequencies that are about 7-14 Hz and humming bird wing frequencies that are about 40-60 Hz.

The systems and methods of the present invention may also be used to detect, identify, monitor and/or track certain types of non-living, moving objects that have relatively fast motions (tens of Hz or higher frequency, i.e., $\geq$10 Hz, $\geq$20 Hz, $\geq$30 Hz, $\geq$40 Hz, $\geq$50 Hz, etc.). Examples of non-living, moving objects detectable by the systems and methods of the present invention include windmills, propellers, such as plane propellers, and artificial (i.e., man-made) nano-flyers.

The systems and methods of the present invention may be used for insect-assisted location of chemical plumes, either for explosives or other objects. For example, the present invention can be used as a robust bee sensor to locate bees which are conditioned or trained to detect certain odors. However, the uses of the present invention are not limited to the detection of target insects attracted to odors but rather to any target which is attracted, naturally or via training and/or conditioning and/or programming, or otherwise directed to any specific object(s). For example, the systems and methods of the present invention may be used for target-assisted location of certain objects which have a particular odor, color, texture and/or shape, wherein the target is naturally attracted to such objects or has been trained, conditioned or programmed to be attracted to such objects.

The present invention provides an optical target detection system that utilizes a laser backscatter system to achieve long-distance remote detection with the sensor system pointed in any desired direction. The present invention is especially suited for remotely searching sample regions for dangerous materials (such as explosives) in an environment with vegetation and other non-insect objects to scatter light.

The present invention further provides ranging capabilities by combining the remote sensing aspects of the present invention with timing-based range determination using Fourier-transform processing of the signal. Briefly, the signal at each range gate is processed with a Fourier transform and peaks in the resulting temporal-frequency spectrum near the known target frequency are used to identify the presence of the target at that location.

In summary, the systems and the methods of the present invention can be used successfully to detect, identify, monitor and/or track any animal or thing generating a frequency greater than that of any wind-blown vegetation in the area or region being remotely observed, wherein such vegetation generally can move fast enough in moving air to cause modulations at a couple of Hz. Further uses and modifications of the systems and methods disclosed herein will become apparent to one skilled in the art upon studying the various aspects of the invention disclosed herein.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION OF THE INVENTION

Figure 1:
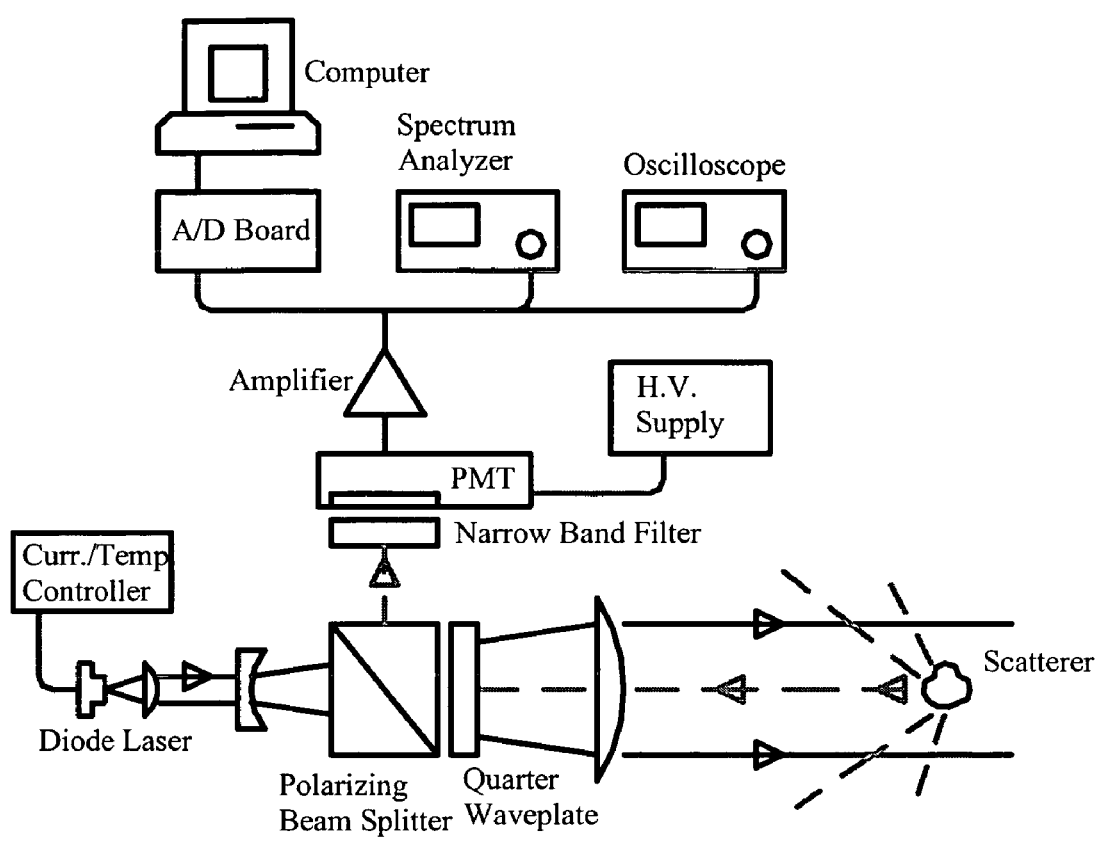
FIG. 1 depicts an experimental setup used for remote detection of a target via wing beat modulation of backscattered continuous-wave (cw) laser light.

All publications and patent applications herein are incorporated by reference to the same extent as if each individual publication or patent application was specifically and individually indicated to be incorporated by reference.

The following description includes information that may be useful in understanding the present invention. It is not an admission that any of the information provided herein is prior art or relevant to the presently claimed inventions, or that any publication specifically or implicitly referenced is prior art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

According to the present invention, laser light scattered by the moving wings of insects in flight is detected with a temporal-frequency-sensitive receiver to distinguish between the insects and other optically scattering objects, such as waving blades of grass. The presence of the insects is indicated in the scattered light by the presence of a temporal modulation at or near the expected wing-beat of the insect under detection. The systems and methods of this invention isolate the light scattered from insects from that scattered by other objects, such as vegetation, that clutter the measurement environment through temporal-frequency filtering.

To implement the systems and methods of the present invention, an optical receiver is pointed at a measurement region that is illuminated by a laser beam. Laser light is scattered by everything that is illuminated by the laser, including vegetation and insects. The optical receiver focuses the collected light onto a detector whose output electrical signal is sampled temporally at a sufficient rate to allow determination of the signal's temporal frequency content to beyond the frequency corresponding to wing motion of insects in flight. Temporal-frequency filtering is used to select and enhance that portion of the scattered-light signal emanating from insects in flight. If a pulsed laser is used to add ranging to the measurement, the pulse-repetition frequency must be at least twice the frequency of the oscillating target frequency to resolve the motion. A higher pulse-repetition frequency is desirable, especially for targets with specular-like reflective properties such as honey bee wings, because the higher pulse rate increases the probability of capturing the wing (or oscillating target) at the angle that provides a strong reflection.

Definitions.

As used herein, each of the following terms has the meaning associated with it in this section.

The articles "a" and "an" are used herein to refer to one or to more than one (i.e. to at least one) of the grammatical object of the article. By way of example, "an element" means one element or more than one element.

As used herein, the term "lidar" is an acronym for Light Detection And Ranging and refers to a remote-sensing technique that uses a laser light source to probe the characteristics of a surface target.

As used herein, the term "laser" is an acronym for Light Amplification by Stimulated Emission of Radiation and refers to a device that produces coherent light with a narrow range of wavelengths. As used herein, light must be understand broadly, since lasers have covered radiation at wavelengths ranging from infrared range to ultraviolet and even soft x-ray range.

As used herein, the terms "Nd:YAG" or "Nd:Yag" are acronyms for neodymium-doped yttrium aluminum garnet ($Nd:Y_3Al_5O_{12}$), a compound that is used as the lasing medium for certain solid-state lasers. The YAG crystal is doped with an active medium, in this case triply ionized neodymium, which replaces another element of roughly the same size, typically yttrium. Generally the crystalline host is doped with around 1 percent neodymium by weight. Nd:YAG lasers are optically pumped using a flashlamp or laser diodes. They are one of the most common types of laser, and are used for many different applications.

As used herein, the terms "oscillate" and "oscillating" refer to motion of any object that can result in scattered light having an amplitude fluctuation that can be detected in its temporal-frequency spectrum and used to identify the object via a characteristic frequency or frequency spectrum.

Insects.

The present invention is used for detecting any insect species that is capable of flight. Representative insect species that could be utilized in the systems and methods of the present invention are listed below.

Representative insects which can be studied using the systems and methods of the present invention include but are not limited to *Aedes albopictus*, and/or *Culex pipiens*, and/or *Anopheles quadrimaculatus*; and/or *Delphacidae* sp., such as *Nilaparvata lugens, Nilaparvata oryzae* and *Sogatella furcifera*; and/or *Cicadellidae* sp., e.g. *Empoasca decipiens, Nephotettix apicalisi, Nephotettix impicticeps, Nephotettix cincticeps* and *Nilaparvata oryzae*; and/or *Pyralidae* sp., e.g. *Tryporyza incertulas, Tryporyza innotata, Cnaphalocrosis medinalis, Chilo loftini, Chilo suppressalis, Chilo indicus* and *Chilotraea plejadellus; Tylenchidae* sp., e.g. *Ditylenchus dipsaci, Ditylenchus angustus* and *Ditylenchus radicicolus*; and/or *Noctuidae* sp., e.g. *Sesamia interens, Sesamia calamistis* and *Sesamia cretica*; and/or *Pentatomidae* sp., e.g. *Scotinophara lurida* and *Scotinophara coarctata*; and/or *Plutellidae* sp., e.g. *Plutella xylostella*; and/or *Tortricidae* sp., e.g. *Archips breviplicanus*; and/or *Cecidomyiidae* sp., e.g. *Orselia oryzae* and *Pachydiplosis oryzae*.

Representative lepidopteran insects include but are not limited to *Pectinophora gossypiella, Bupalus piniarius, Cheimatobia brumata, Lithocolletis blancardella, Hyponomeuta padella, Plutella* sp., e.g. *Plutella xylostella, Malacosoma neustria, Euproctis chrysorrhoea, Lymantria* sp., e.g. *Bucculatrix thurberiella, Phyllocnistis citrella, Agrotis* sp., e.g. *Agrotis segetum, Agrotis ipsilon, Euxoa* sp., *Feltia* sp., *Earias insulana, Heliothis* sp., e.g. *Helicoverpa armigera, Helicoverpa armigera, Helicoverpa zea, Laphygma exigua, Mamestra brassicae, Panolisflammea, Prodenia litura, Spodoptera* sp., e.g. *Spodoptera littoralis, Spodoptera litura, Spodoptera exigua, Trichoplusia ni, Cydia pomonella, Pieris* sp., *Chilo* sp., e.g. *Chilo suppressalis, Pyrausta nubilalis, Ephestia kuehniella, Galleria mellonella, Cacoecia podana, Capua reticulana, Choristoneura fumiferana, Clysia ambiguella, Hofmannophila pseudospretella, Homona magnanima, Tineola bisselliella, Tinea pellionella, Elasmopalpus* sp., *Hydraecia* sp., *Loxostege* sp., *Ostrinia* sp., and *Spoladea* sp., e.g. *Tortrix viridana*.

Representative coleopteran insects include but are not limited to *Anobium punctatum, Rhizopertha dominica, Bruchidius obtectus, Acanthoscelides obtectus, Hylotrupes bajulus, Agelastica alni, Leptinotarsa decemlineata, Phaedon cochleariae, Diabrotica* sp., e.g. *Diabrotica undecimpunctata, Diabrotica virgifera, Psylloides chrysocephala, Epilachna varivestis, Atomaria* sp., e.g. *Atomaria linearis, Oryzaephilus surinamensis, Anthonomus* sp., e.g. *Anthonomus grandis, Otiorhynchus sulcatus, Cosmopolites sordidus, Ceuthorrynchus assimilis, Hypera postica, Dermestes* sp., *Trogoderma* sp., *Anthrenus* sp., *Attagenus* sp., *Lyctus* sp., e.g. *Meligethes aeneus, Ptinus* sp., e.g. *Niptus hololeucus, Gibbium psylloides, Tribolium* sp., e.g. *Tenebrio molitor, Agriotes* sp., e.g. *Agriotes lineatus, Conoderus* sp., e.g. *Melolontha melolontha, Amphimallon solstitialis, Aeolus* sp., *Araecerus* sp., *Aulacophora* sp., *Cerotoma* sp., *Chaetocnema* sp., *Cylas* sp., *Diaprepes* sp., *Graphognathus* sp., *Heteronychus* sp., *Holotrichia* sp., *Hypomeces* sp., *Leucopholis* sp., *Lepidiota* sp., *Limonius* sp., *Listroderes* sp., *Melanotus* sp., *Phyllotreta* sp., *Phyllophaga* sp., *Popillia* sp., *Sitona* sp., and *Tanymecus* sp., e.g. *Costelytra zealandica*.

Representative dipteran insects include but are not limited to *Drosophila melanogaster, Chrysomyxa* sp., *Hypoderma* sp., *Tannia* sp., *Bibio hortulanus, Oscinellafrit, Phorbia* sp., *Pegomyia hyoscyami, Ceratitis capitata, Dacus oleae, Tipula* sp., *Tipulapaludosa, Atherigona* sp., *Delia* sp., and *Hylemia* sp., *Psila rosae*, and *Tipula oleracea*.

Bees can also be studied using the systems and methods of the present invention. There are 10,0000-20,000 species of bee including many was like and flylike bees. Most bees are small from 2 mm (0.08 inches) long to 4 cm (1.6 inches) long. Bees and wasps are closely related. Examples of common bees are paper wasps (*Polistes*, multiple species), yellow jackets (*Vespula*, multiple species), baldfaced hornets (*Vespula*), bumble bees (*Bombus*, multiple species), honeybees (*Apis mellifera*), small carpenter bees (*Ceratina*, multiple species) and large carpenter bees (*Xylocopa*, multiple species).

Insect Detection of Chemicals.

Insects are capable of detecting a wide variety of volatile and semi-volatile chemicals, wherein such chemicals are produced biologically or non-biologically. Many insect species show a particular preference for specific odors.

For example, the tsetse fly, *Glossina morsitans morsitans*, is attracted to 4-methylphenol. Eddy et al. (U.S. Pat. No. 3,912,810) describe a method of attracting yellowjackets using an ester having an alcohol and an acid moiety and having a chain length of from 10 to 12 carbon atoms. 2,4-Hexadienyl butyrate, 2,4-hexadienyl propionate and 2,4-hexadienyl isobutyrate were shown to attract *V. pensylvanica* (Davis et al. 1967. J. Med. Entomol. vol. 4, pp. 275-280) as well as heptyl butyrate (Davis et al. 1969. J. Econ. Entomol. vol. 62, p. 1245; Davis et al. 1973. Environmental Entomol. vol. 2, pp. 569-571; MacDonald et al. 1973. Environmental Entomol. vol. 2, pp. 375-379) and octyl butyrate (Davis et al. 1972. Environmental Entomol. vol. 1, p. 673; McGovern et al. 1970. J. Econ. Entomol. vol. 63, pp. 1534-1536).

Chemical attractants for yellowjackets and wasps have also been described by Landolt, P. J. (1998. Environmental Entomol. vol. 27, no. 4; Landolt, P. J., U.S. Pat. No. 6,083,498, 2000) and include compositions of vapor blends of acetic acid and one or more of isobutanol, racemic 2-methyl-1-butanol, S-(−)-2-methyl-1-butanol, 2-methyl-2-propanol, heptyl butyrate and butyl butyrate. Aldrich et al. (1986. Experientia. vol. 42, pp. 583-585) identified components of the pheromone of the predaceous spined soldier bug which attract eastern yellowjacket (and related species) workers and queens: mixtures of either (E)-2-hexenal and .alpha.-terpineol or (E)-2-hexenal and linalool.

The cellular basis of odor detection has been explored in detail in *Drosophila*, whose relatively simple olfactory system allows precise physiological measurements of individual odorant receptors. Sixteen functional classes of receptors, each with a unique response spectrum to a panel of 47 odors, were identified from recordings of antennal basiconic sensilla (de Bruyne et al., 2001, Neuron 30:537-552). Female mosquitoes detect the presence of human volatile emissions by the odorant receptors (ORs) located on their antennae and initiate an olfactory signal transduction cascade. To date, a total of 79 odorant receptor (AgOR) genes have been identified and characterized. in *Anopheles gambiae* (Hill et al., (2002) Science 298: 176-178.).

Rostelien et al. (J Comp Physiol [A]. September 2000; 186(9):833-47) identified the selective receptor neurone responses to E-beta-ocimene, beta-myrcene, E,E-alpha-farnesene and homo-farnesene in the moth *Heliothis virescens* by using gas chromatography linked to electrophysiology. A divergent gene family encoding candidate olfactory receptors of the moth *H. virescens* was identified by Krieger et al. (Eur J Neurosci. August 2002; 16(4):619-28).

Screening of antennal cDNA libraries with an oligonucleotide probe corresponding to the N-terminal end of a *Antheraea polyphemus* pheromone-binding protein (PBP), led to the identification of full length clones encoding odorant receptor proteins in the silkworm species *A. polyphemus* (Apol PBP3) and *A. pernyi* (Aper PBP3) (Kreiger et al., Eur J Biochem.

May 2000; 267(10):2899-908). Binding studies with the two main pheromone components of *A. polyphemus* and *A. pernyi*, the (E,Z)-6, 11-hexadecadienyl acetate (AC1) and the (E,Z)-6,11-hexadecadienal (ALD), revealed that in *A. polyphemus* both Apol PBP1a and the new Apol PBP3 bound the 3H-labeled acetate, whereas no binding of the 3H-labeled aldehyde was found.

Honeybees can be conditioned to seek out chemical smells through feeding. Bee-assisted location of chemical plumes is practical, such as for detecting explosives, natural gas emissions, chemical spills, etc. When this conditioning is done in a way to cause the bees to seek out some target object, the location of that object can be determined through remote optical measurements that determine the region in space where bees are detected most frequently. To enable such measurements in cluttered environments, it is necessary to be able to distinguish the optical signature of bees from that of other objects in the local environment. The present invention provides the ability to select and enhance the detection of insects, such as bees, above the detection of other cluttering objects. Therefore, a remote optical measurement is made practical by the systems and methods of the present invention without the need for controlling the measurement space by removing objects that may be mistaken for the insects in an optical measurement. Bromenshenk et al. (Journal of Mine Action, 7.3, December 2003) demonstrated the use of a scanning lidar and bees for locating buried landmines. The lidar was scanned horizontally over a mine field and maps were created of bee density, from which the locations of buried land mines were inferred. The lidars in the experiments of Bromenshenk et al. were operated in direct-detection mode, in which bees, grass, and other vegetation and objects create similar bright backscatter signals, because of which grass had to be mowed in the field to avoid confusing the grass blades and bees in the return signal.

The present invention detects signals that are sufficiently unique to the insect of interest so that the insects can be detected even while the laser beam is simultaneously illuminating blades of grass, the target insect, and other/different objects in the sensor field of view. None of the prior art methods of bee detection demonstrated a detection technique that could operate in a natural, cluttered environment without preconditioning, such as mowing the grass beforehand. The present invention is based upon a sufficiently unique signal generated by the insect-wing motion so that one is able to isolate the insect signal from the background signal using the systems of the present invention. Thus, using the systems and methods of the present invention one can measure the wing-beat frequency spectrum of an insect species whether it is truly unique from all other insect species or not. This is demonstrated with the bee-wing motion utilized in the examples that follow. Furthermore, the systems and methods of the present invention provide the capability of identifying specific insect types and/or species if it has a unique enough wing-beat signature to be distinguished from other insect types and species (i.e., it has a wing-beat signature sufficiently unique from other insects to allow identification of the insect type or species in addition to being able to detect, monitor and track it).

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

EXPERIMENTAL EXAMPLES

The invention is now described with reference to the following examples. These examples are provided for the purpose of illustration only and the invention should in no way be construed as being limited to these examples but rather should be construed to encompass any and all variations which become evident as a result of the teaching provided herein.

Overview of Experiments 1-3.

Previously, we deployed a direct-detection lidar at Fort Leonard Wood, Ms. to determine if lidar could be used to detect bees that locate buried landmines through smell. The experiment showed that the lidar did measure higher bee concentration near the landmines, but the direct-detection lidar technique was only feasible if the grass and other vegetation was mowed prior to the measurements. Otherwise, the lidar detected bright spots of light backscattered from both insects and vegetation and provided no information that allowed separation of the bee signal from the vegetation. See, Bromenshenk et al., "Can honey bees assist in area reduction and landmine detection?," J. Mine Action 7.3 (2003) and Shaw et al., "Polarization lidar measurements of honey bees for detecting land mines," Optics Express 13(15), 5853-5863 (2005), each of which are herein specifically incorporated in their entireties.

For the present invention, we conducted experiments in the laboratory and outside in the field to demonstrate detection of bees with a sufficiently unique signature relative to that of the nearby vegetation. This was accomplished by detecting backscattered laser light that was modulated at the honeybee wing-beat frequency.

This invention can be used to detect specific objects that are of particular interest to the target being tracked. For example, honeybees can be conditioned to seek out chemical smells through feeding. When this conditioning is done in a way to cause the bees to seek out some specific object or thing, the location of that object or thing can be determined through remote optical measurements that determine the region in space where bees are detected most frequently. To enable such measurements in cluttered environments, it is necessary to be able to distinguish the optical signature of bees from that of other objects in the local environment. The present invention provides the ability to select and enhance the detection of the target (e.g., bees) above the detection of other cluttering objects. Therefore, a remote optical measurement is made practical without the need for controlling the measurement space by removing objects that may be mistaken for the target (e.g., bees) in an optical measurement. A particular implementation of the wing-beat modulation detector using a pulsed laser allows range-dependent detection of bees or other insects, which allows insect identification and location (to within the range uncertainty provided by the combination of the optical pulse length and electrical sampling rate).

As explained in greater detail below, we conducted laboratory and field experiments that demonstrated the ability to detect honeybees (*Apis mellifera*) remotely in a cluttered environment by analyzing the temporal frequency content of scattered laser light. In these experiments we used a diode laser instrument capable of honeybee detection in a cluttered environment. A continuous wave (cw) diode laser provides an output beam that illuminates a target. An illuminated honeybee's wings will scatter light back to the instrument with intensity modulation resulting from the wing motion. This modulated signal will be between 170-270 Hz, the characteristic wing beat frequency of honeybees. We demonstrate herein that this modulated signal can easily be discriminated from larger background signals that are not modulated.

Light scattered from the moving wings of the bees is modulated at a temporal frequency between approximately 170 and 270 Hz, while light scattered from vegetation and other objects in the vicinity of the bees is either not modulated at all or modulated at frequencies near zero Hz. Furthermore, when a bee moves into or out of a continuous-wave (cw) laser beam it produces a step function that contributes a signal across many temporal frequencies (i.e., the Fourier transform of a pulse is a constant at all frequencies). While the bee remains within the beam, it contributes signal primarily near its primary frequency and related harmonics. This is a mechanism that can be used to measure not only bee existence, but bee dwell time within a sample region. This is a potentially important piece of information when bees are being detected for the purpose of locating some object through smell (e.g., bees locating landmines or other explosives). In a procedure such as this one, bees slow down and spend more time near the target, so measuring bee dwell time is as important as measuring bee existence.

For the purposes of this example, we implemented a prototype sensor using a diode laser at 808 nm wavelength, but this remote measurement scheme could be implemented at nearly any laser wavelength. Diode lasers are used in our prototype because they provide the advantage of low cost and small size.

These experiments in the laboratory and outside in the field demonstrate detection of bees with a unique signature relative to that of the nearby vegetation. We accomplished this by detecting backscattered laser light that was modulated at the honeybee wing-beat frequency. This is an entirely different detection scheme from any of the previous lidar work primarily because it uses wing-beat modulated light rather than direct detection, which allows the sensor to isolate bees from other objects.

Example 1

Representative Schematic of the Optical Layout of the Diode Laser System

A schematic of the optical layout of the diode laser system of the present invention is shown in FIG. 1. A continuous-wave (cw) single mode Fabry-Perot laser diode is used as the laser source for the instrument. The laser diode can provide up to 100 mW of optical power in cw operation at 808 nm with a horizontal polarization with an aspect ratio of approximately 3×1. A commercial current and temperature controller is used to operate the laser diode. The output light from the laser diode is collimated using an aspheric lens with a focal length of 4.5 mm and a numerical aperture of 0.55. An achromatic anamorphic prism pair is used to shape the output of the laser diode and collimating lens into a more circular beam. The light is next incident on a 37 mm diameter diverging lens with a focal length of −50 mm. After the diverging lens, the horizontally polarized light passes through a polarizing beam splitting cube and a quarter wave-plate producing circularly polarized light that is collimated by a 150 mm diameter lens with a focal length of 450 mm that collimates the light producing the output of the instrument. The optical power of the instrument was set at 28 mW, well below the 100 mW maximum optical power of the diode laser. Output light scattered back to the receiver from objects in the field of view passes through 150 mm diameter lens and through the quarter wave-plate to create vertically polarized light. The backscattered vertically polarized light is directed by the polarizing beam splitting cube through a narrow-band filter onto a photomultiplier tube (pmt). The narrow-band filter has a 10 nm passband centered at 810 nm. The pmt was biased with a commercial high voltage supply with a voltage of −600V. The voltage output of the pmt is proportional to the optical power incident on the pmt comprising of backscattered laser light and background light.

The pmt voltage passes through a preamplifier with a gain of 400, after which it is filtered using a four-pole Butterworth lowpass filter with a 3 dB cutoff frequency near 500 Hz to produce a band-limited signal. This filter was needed to eliminate aliasing effects during the subsequent signal processing (Oppenheim et al., Signal and Systems, second edition, Prentice Hall, N.J., 1997, 514-581). After the preamplifier and low pass filter, the voltage signal could be studied using an oscilloscope, an RF spectrum analyzer, or an analog to digital (A/D) board and a computer.

An A/D board was used to sample the output voltage signal of the pmt with a sampling rate of 5000 samples/second. These samples were collected over a period ranging from several seconds to several minutes to create a digital time series of the detected light. A Fourier transform of the sampled signal was performed using MatLab® software to create a power spectrum as a function of time. Any software or hardware implementation of the Fourier transform algorithm could be used, but our experiments used a fast Fourier transform algorithm (e.g. A. V. Oppenheim and R. W. Schafer, *Discrete-time signal processing*, Prentice-Hall Publishers, 1989, ch. 9) included in the MatLab® software (The MathWorks, Inc., 3 Apple Hill Drive, Natick, Mass. 01760-2098, www.mathworks.com).

The envisioned deployment of the instrument described in FIG. 1 is a check point scenario where ranging information is not important. As cars and trucks are stopped at a check point, the instrument can be used to determine if the explosives are hidden in any of the vehicles from a safe stand-off distance. In this case, the infrared, lower power, eye-safe operation of the instrument is a benefit. Other deployment scenarios include scanning modest areas for area reduction in humanitarian demining, perhaps with ranging determined through triangulation of two scanning cw laser beams.

Example 2

Laboratory Experiments Using Diode Laser System

Figure 2:
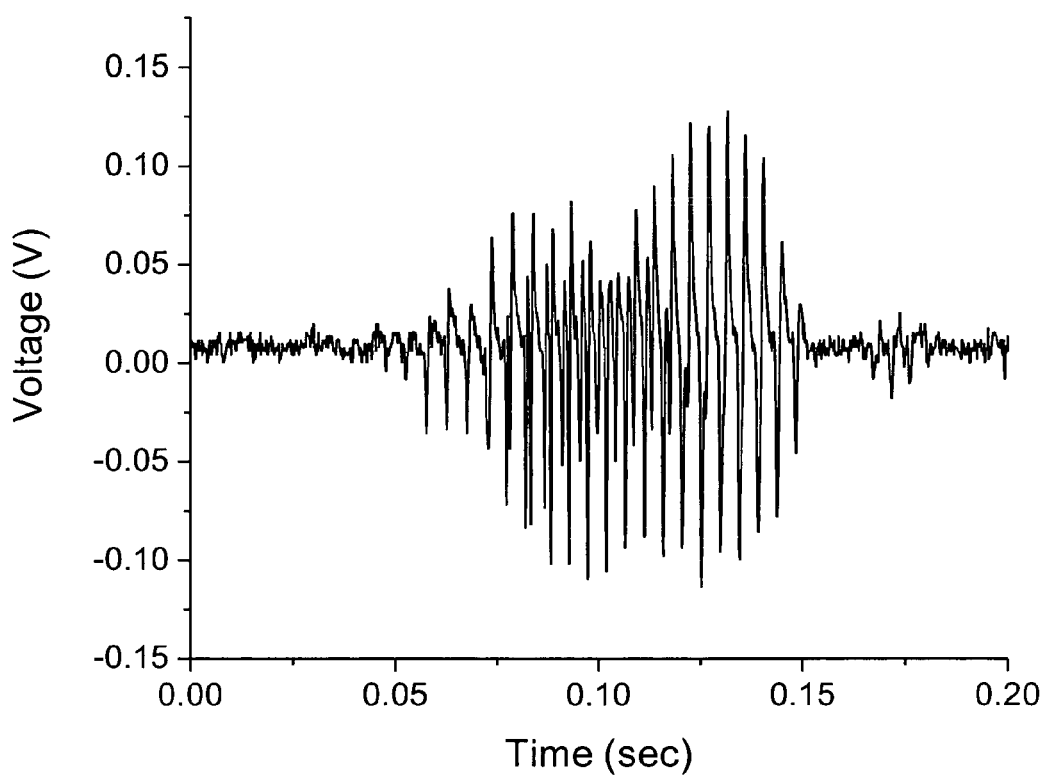
FIG. 2 depicts a plot of voltage as a function of time of the return signal measured in the laboratory with the instrument aimed at a live honeybee in a jar. The light scattered back to the detector from the moving honeybee wings causes a modulated return signal with a frequency specific to the honey bee. The modulated return signal can be used to pick out a honey bee as it flies through the laser beam against a cluttered background.

The instrument shown in FIG. 1, which is contained on a 60×60 cm optical breadboard, was initially tested in a laboratory setting. A small glass jar was placed approximately four meters away from the instrument. The jar provided backscattered light that was easily seen by the DC-coupled oscilloscope. The coupling of the oscilloscope was changed from DC-coupling to AC-coupling and a live honeybee was placed in the jar. A plot of the AC-coupled voltage as a function of time is shown in FIG. 2. The honeybee began flapping its wings from between 50 ms and 150 ms and stopped. The light scattered from the bee's moving wings produced a modulated signal at the pmt that is easily seen in FIG. 2 even though a greater amount of light is scattered by the jar.

Figure 3:
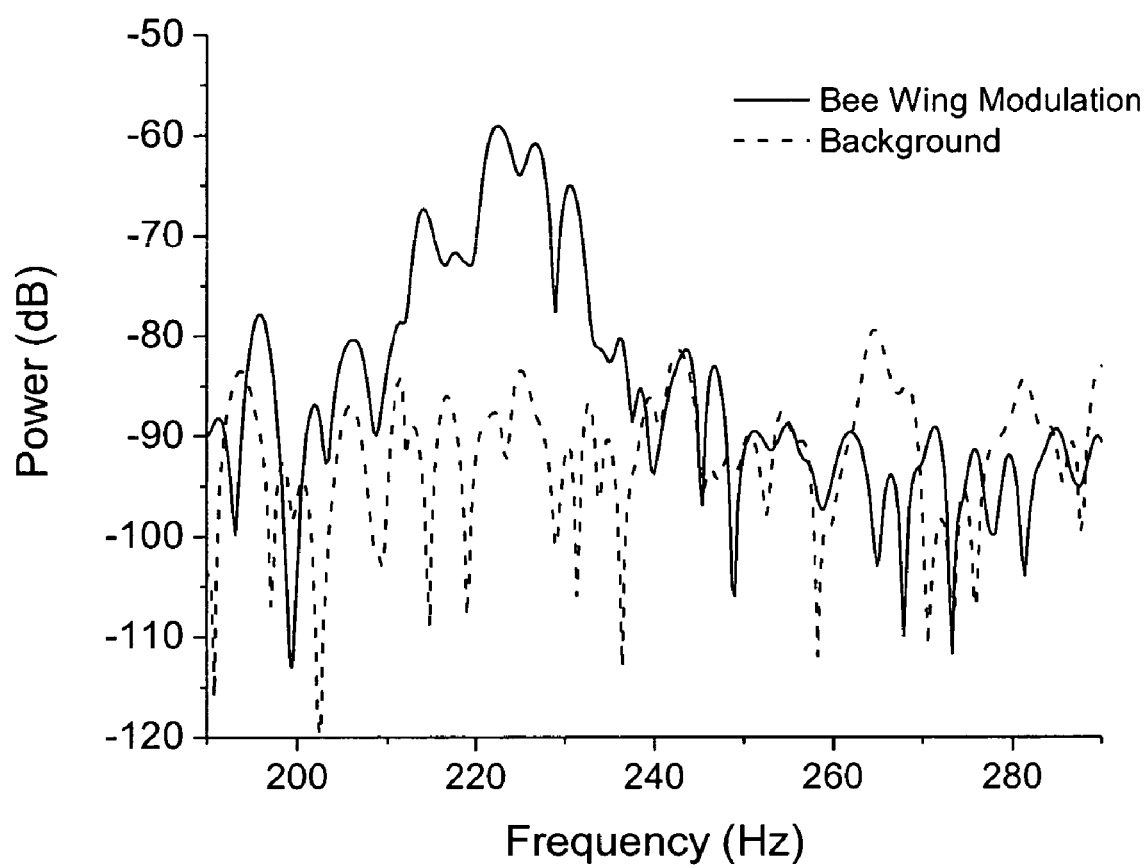
FIG. 3 depicts a plot of the return signal power as a function of frequency. The solid line represents a modulated return signal from a honey bee's moving wing while the dashed line represents the background return signal.

A plot of the pmt signal power as a function of frequency is shown in FIG. 3 again measured with a honeybee placed in a jar approximately four meters away from the instrument. The solid line represents the return signal modulated by bee wing flapping, while the dashed line represents the return signal when the bee stopped flapping its wings. The signal from the wing-beat modulated scattered light produces a modulated signal near 200 Hz. The frequency spectra of the modulated return signal varies as the environmental conditions and the honeybee's activity levels change. However, measurements we have performed showed the modulated return signal from the bee wings to be in the range of 170-270 Hz.

Example 3

Field Experiments Using Diode Laser System

The instrument was operated in the field (i.e., outside in a natural setting and not in a controlled laboratory situation) and measurements were made of honeybees flying into and out of a bee hive. The instrument was placed 20 m away from a bee hive that was surrounded by vegetation. This setup would make direct-detection measurements impossible using the systems/methods that were known prior to the present invention. A portable generator was used to provide the electrical power for the instrument. During the field tests, the output of the pmt was sent to a preamplifier and a band limiting filter. A computer was used to record the pmt signal as a function of time.

Figure 4:
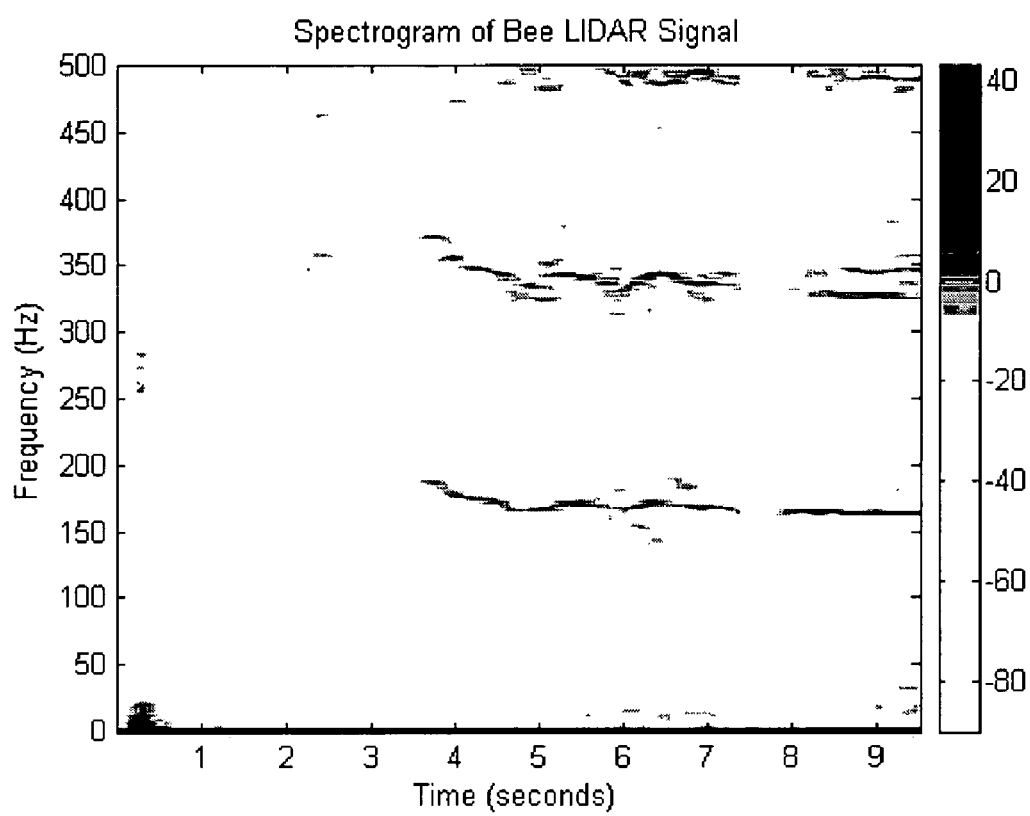
FIG. 4 depicts field detection of honeybees using the instrument shown in FIG. 1. Time is plotted along the x-axis while frequency is plotted along the y-axis. A plot of the power in each frequency bin is represented by the grey scale. Honeybees flew into the laser beam during the 4-9 second time window of the plot. The honey bee detection shows up at a frequency near 170 Hz. The second harmonic of the wing modulation shows up near 340 Hz.

After data were collected, a MatLab® program was used to compute a discrete time Fourier transform of the signal. A plot of the power spectrum as a function of time is shown in FIG. 4. Time is plotted along the x-axis, frequency along the y-axis, and the relative power at a particular frequency at a particular time is represented by the grey-scale. These typical data show honeybees flying through the laser beam in the 4-9 second time window. The honey bee detection signal shows up at 170 Hz, along with the second harmonic near 340 Hz and the third harmonic near 510 Hz.

Data shown in FIG. 4 were taken with the laser aimed at the white beehive, providing a high level of backscattered light. This light, however, is not modulated and provides a signal at the DC level. In this way, the return signal from the honeybees can be differentiated from the return signal from the background. Similar results were obtained when the laser beam was aimed at the background vegetation.

Example 4

Range-Dependent Electro-Optical Detection of Insects in a Cluttered Environment Using Wing-Beat Modulation of Pulsed Laser Light The continuous-wave wing-beat modulation experiments discussed above under Experiments 1-3 demonstrate that detection of wing-beat modulated laser light is capable of detecting bees in a cluttered environment. However, according to the procedures of these experiments, range to the target (e.g., bees) is only available through methods such as triangulation with multiple sensors. This present experiment relies on the unique signal generated by the bee-wing motion to isolate the bee signal from the background signal, but also adds ranging through the use of a precisely timed and rapidly repeated stream of short laser pulses. The method of determining range to an object is standard in lidar measurements, but the present invention is made possible through the combination of such timing-based range determination with Fourier-transform processing of the signal to identify bees through the wing-beat modulation in the temporal frequency domain. The signal at each range gate is processed with a Fourier transform, and peaks in the resulting temporal-frequency spectrum near the known bee wing-beat frequency are used to identify the presence of bees at that location.

Pulsed laser light scattered by the moving wings of bees in flight is detected with a temporal-frequency-sensitive receiver to distinguish between bees and other optically scattering objects. For example, the presence of bees is indicated in the scattered light by the presence of a temporal modulation at or near the expected wing-beat frequency of a bee. The present invention isolates the light scattered from bees from that scattered by vegetation or other objects that clutter the measurement environment through temporal-frequency filtering. The range to the detected bees is determined through the time required for a laser pulse to travel from the instrument to the bee, reflect from the wings, and travel back to the receiver. As regards the detection of honeybees, a key element of the invention is the use of pulse-repetition rates high enough to provide high probability of detection for brief reflections ("glints") from honey bee wings moving at approximately 250 Hz. Alternately, this can be thought of as the need for a pulse repetition rate that is higher than the Nyquist sampling frequency required to reproduce the discretely sampled wing-beat motion (i.e., greater than twice the honey bee wing-beat frequency, or greater than approximately 500 Hz). For information on the Nyquist sampling frequency, see, for example, Whittaker, "On the Functions Which are Represented by the Expansions of the Interpolation Theory," Proc. Royal Soc. Edinburgh, Sec. A, vol. 35, pp. 181-194 (1915); Nyquist, "Certain topics in telegraph transmission theory," Trans. AIEE, vol. 47, pp. 617-644 (April 1928); Kotelnikov, "On the carrying capacity of the ether and wire in telecommunications," Material for the First All-Union Conference on Questions of Communication, Izd. Red. Upr. Svyazi RKKA, Moscow (1933) (Russian); and, Shannon, "Communications in the presence of noise", Proc. Institute of Radio Engineers, vol. 37, no. 1, pp. 10-21 (January 1949), each of which is herein incorporated by reference in its entirety.

As an example of the present invention, we built and tested a prototype sensor using a high-repetition-rate laser (Nd:Yag, frequency doubled to emit light with wavelength=532 nm, but this measurement scheme could be implemented at nearly any laser wavelength).

The layout of the instrument used for these experiments is nearly identical to that shown for the continuous-wave (cw) system in FIG. 1 (i.e., a quasi-collimated laser beam is transmitted, and backscattered light is detected through a small telescope that feeds the light through an optical filter onto an optical detector). However, the key differences between the system used in this experiment and the experiments discussed above are as follows:

1) the laser is now pulsed instead of continuous-wave (cw);
2) the laser pulse-repetition frequency (PRF) is sufficiently fast to provide for the high probability of a laser pulse hitting the insect wing when the wing is oriented to provide a bright reflection back to the sensor (i.e., a more common low-PRF laser might miss many of the wing-beat reflections); and
3) the computer software performs temporal-frequency processing (via Fourier transforms) of the signal at each range gate defined by the laser pulse width and electronic sample rate. In contrast, the previously disclosed system used a cw laser that provided no direct information on range to the insect, thereby only indicating insect presence. The current pulsed system is a lidar (Light Detection And Ranging) system in the sense that it provides range with target detection, but it differs in its use of the temporal frequency content to identify insects at their wing-beat frequencies.

Figure 5:
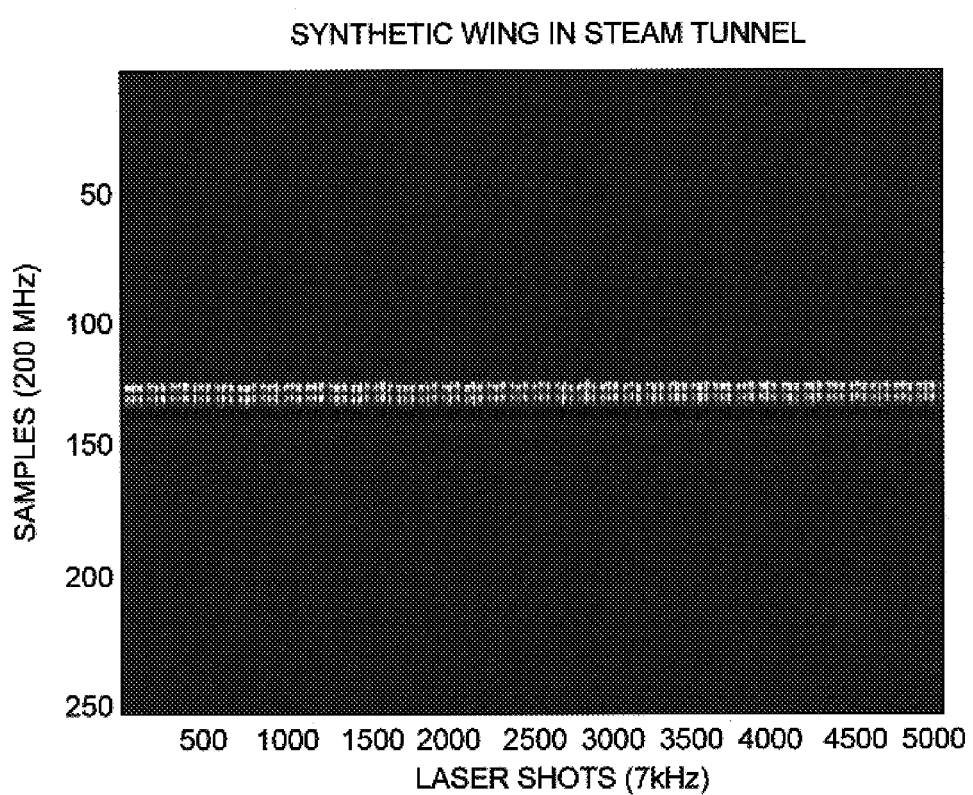
FIG. 5 depicts detector voltage shown as a function of range bins (vertical) and laser shot number (horizontal) for a version of the wing-beat modulation sensor system using a pulsed laser. Color can be used to represent the detector voltage at a particular range bin and laser shot.

FIG. 5 is an example of a signal obtained with a wing-beat-modulation lidar, in this case looking at an artificial bee wing oscillating at a frequency of approximately 160 Hz. The vertical axis shows the sampled signal (i.e. range) and the horizontal axis is the laser shot number (i.e. time). The bright-dark oscillating signal near sample 130 shows the laser light reflected from the oscillating bee wing.

Figure 6:
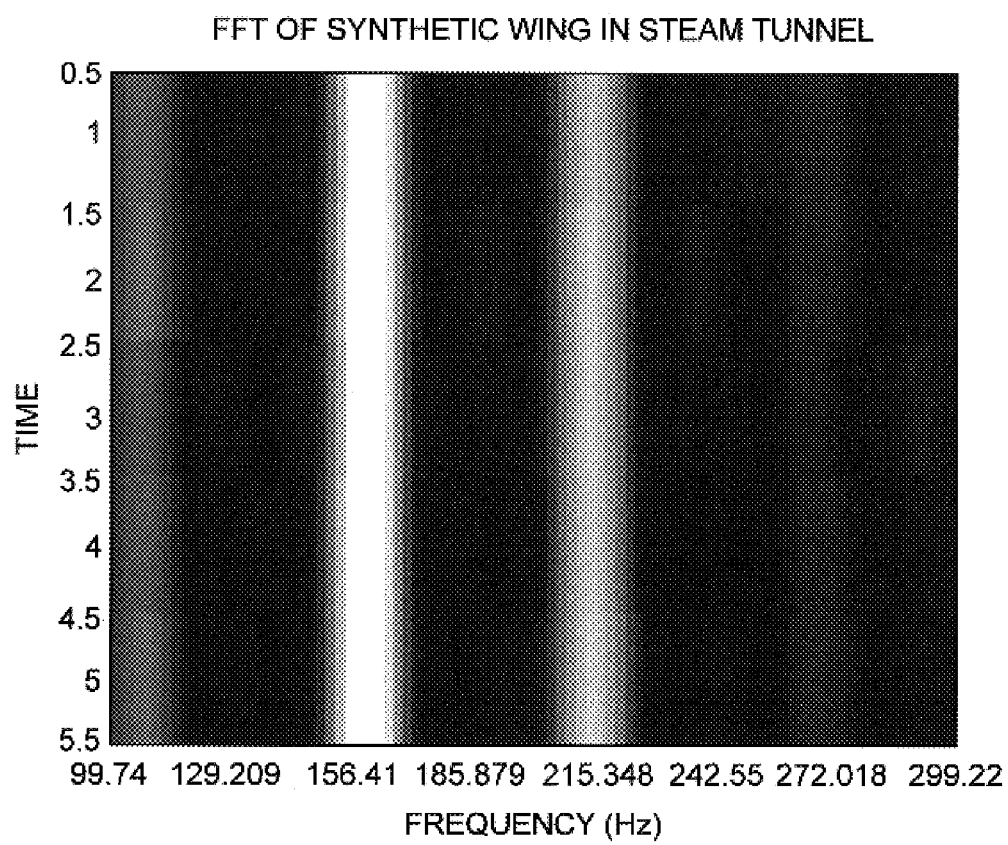
FIG. 6 depicts a sliding-window fast Fourier transform of the data shown in FIG. 5 at range bin 114. A synthetic bee wing was driven at 160 Hz. This demonstrates that the wing-beat frequency can be retrieved at a specific range bin with backscattered light from a pulsed laser.

FIG. 6 shows the temporal-frequency plot corresponding to FIG. 5. In FIG. 6, the vertical axis is time and the horizontal axis is temporal frequency. The bright line near 160 Hz is the signal created by detection of light modulated by the oscillating bee wing. A harmonic signal near 220 Hz is also visible. In practice, a version of FIG. 6 is created for each range value in FIG. 5 and insects are identified at that range when bright signals are obtained near the expected wing-beat frequency. Other oscillating objects, such as birds, bats, etc., could also be identified, located, or tracked using this method.

All previous optical insect detection systems are fundamentally different from the presently-disclosed laser backscatter system that can achieve long-distance remote detection with the sensor system pointed in any desired direction, especially to sample regions of dangerous materials (such as explosives). As discussed above, previous systems include direct-detection lidar, which can achieve long-distance detection but without the unique signature provided by wing-beat frequency analysis, and wing-beat modulation of sunlight or a nearby light source, neither of which can provide long-range detection in arbitrary directions. Herein we describe a pulsed laser sensor that identifies the presence and location of insects through detection of backscattered laser light that is temporally modulated at the insect wing-beat frequency.

The foregoing detailed description has been given for clearness of understanding only and no unnecessary limitations should be understood therefrom as modifications will be obvious to those skilled in the art.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

The disclosures of each and every patent, patent application, and publication cited herein including but not limited to the references listed immediately below are hereby incorporated herein by reference in their entirety.

What is claimed:

1. A method for detecting an oscillating target, the method comprising:
    illuminating a measurement region using a pulsed laser beam;
    collecting, for each of a plurality of ranges to one or more potential oscillating targets for which a return signal is present, a time series of return signals for that range;
    computing a frequency-domain transform of each collected time series; and
    analyzing the frequency-domain transform of each collected time series to determine whether modulation is present within a predetermined range of frequencies spanning an oscillation frequency associated with the oscillating target.

2. The method of claim 1, wherein a pulse repetition frequency of the pulsed laser beam substantially exceeds a Nyquist sampling frequency associated with the oscillation frequency.

3. The method of claim 1, wherein the oscillating target is one of a flying insect, a flying bird, a flying mammal, and a propeller-driven object.

4. The method of claim 3, wherein the flying insect is one of a fly, a bee, and a wasp, the oscillation frequency being produced by the beating of wings.

5. The method of claim 4, wherein the bee is a honeybee.

6. The method of claim 3, wherein the flying insect is trained or conditioned to locate a specific chemical.

7. The method of claim 6, wherein the specific chemical is associated with explosives.

8. The method of claim 7, wherein the explosives are associated with landmines.

9. The method of claim 1, wherein the frequency-domain transform is a Fourier transform.

10. The method of claim 1, wherein the oscillation frequency is greater than that of any wind-blown vegetation in the measurement region.

11. The method of claim 1, wherein the plurality of ranges are derived from measured times of flight of the pulsed laser beam.

12. A system for detecting an oscillating target, the system comprising:
    a pulsed laser to illuminate a measurement region;
    an optical detector;
    an optical receiving apparatus to collect return signals and feed the return signals to the optical detector, the optical detector producing an output signal; and
    a computing device to receive the output signal from the optical detector, the computing device being configured to:
        collect, for each of a plurality of ranges to one or more potential oscillating targets for which a return signal is present, a time series of return signals for that range;
        compute a frequency-domain transform of each collected time series; and
        analyze the frequency-domain transform of each collected time series to determine whether modulation is present within a predetermined range of frequencies spanning an oscillation frequency associated with the oscillating target.

13. The system of claim 12, wherein the oscillating target is one of a flying insect, a flying bird, a flying mammal, and a propeller-driven object.

14. The system of claim 13, wherein the flying insect is one of a fly, a bee, and a wasp, the oscillation frequency being produced by the beating of wings.

15. The system of claim 14, wherein the bee is a honeybee.

16. The system of claim 13, wherein the flying insect is trained or conditioned to locate a specific chemical.

17. The system of claim 16, wherein the specific chemical is associated with explosives.

18. The system of claim 17, wherein the explosives are associated with landmines.

19. The system of claim 12, wherein the optical detector includes a photomultiplier tube.

* * * * *